United States Patent [19]
Roth

[11] Patent Number: 5,857,205
[45] Date of Patent: Jan. 5, 1999

[54] METHOD FOR DETERMINING IF DATA ITEM CHARACTERISTICS IN PERIODICALLY UPDATED AND REPLACED FILES HAVE UNEXPECTEDLY CHANGED

[76] Inventor: Michael Roth, 101 Washington Ave., Staten Island, N.Y. 10314

[21] Appl. No.: 695,871

[22] Filed: Aug. 12, 1996

[51] Int. Cl.$^6$ .................................................. G06F 17/30
[52] U.S. Cl. ........................ 707/203; 707/200; 707/201; 707/202; 707/204
[58] Field of Search .................................. 707/200, 203, 707/204, 202

[56] References Cited

U.S. PATENT DOCUMENTS

| | | | |
|---|---|---|---|
| 4,809,170 | 2/1989 | Leblang et al. | 395/703 |
| 5,485,575 | 1/1996 | Chess et al. | 395/183.14 |
| 5,511,188 | 4/1996 | Pascucci et al. | 707/203 |
| 5,608,874 | 3/1997 | Ogawa et al. | 395/200.15 |

Primary Examiner—Thomas G. Black
Assistant Examiner—Donald Min
Attorney, Agent, or Firm—Jean-Marc Zimmerman

[57] ABSTRACT

A method for verifying computer generated data in periodically updated and replaced files to determine if data item characteristics in the files have changed in an unexpected manner. The method involves the steps of selecting a first version of each of the data item characteristics and selecting a second subsequent version of each of the data item characteristics. The first version of each of the data item characteristics and the second subsequent version of each of the data item characteristics are analyzed to produce first and second statistical profiles. The first and second statistical profiles of each of the data item characteristics are then compared to each other to determine if any of the data item characteristics have changed in an unexpected manner. Finally, the files being periodically updated and replaced are monitored to determine if the data item characteristics in the files have changed in an unexpected manner.

41 Claims, 11 Drawing Sheets

22
WARNINGS AND NOTIFICATIONS

24
FILE IDENTIFICATION

FILE NAME (DESCRIPTIVE NAME):
DSN (USE "(0)" FOR GDG's):

26
RECORD LAYOUT:

PROGRAM FILE/COPY LIBRARY DSN:
COPY MEMBER (WHERE APPLICABLE):
LIBRARY TYPE ("P" PANVALET, BLANK FOR OTHER FILES

28
IDENTIFICATION FOR FILES WITH MULTIPLE RECORD LAYOUTS:

RECORD IDENTIFIER DATA ITEM NAME:
RECORD IDENTIFIER DATA ITEM VALUE:

30
CONTROL INFORMATION:

SYSTEM GENERATED FILE ID:
CONFIRM THE CHANGE OF FILE DSN (Y):
CONFIRM DELETION (D):

FIG. 2C

PROGRAM: XXXXXX   DATA ITEM IDENTIFICATION   PAGE 1
DATE: 01/29/96   REPORT 1: COMPLETE DATA ITEM LISTING

FILE:           FILE SAMPLE DATA

| ITEM | LVL | NAME | PICTURE | OCCURENCE # OF | DPTH | CHR | NBR/TYPE | DIGITS | DECIMAL SHIFT | SIGN | DEPEND ITEM # | START POS | LEN |
|---|---|---|---|---|---|---|---|---|---|---|---|---|---|
| 1 | 01 | '&FILE'-RECORD | | | | N | GROUP | | | | | 1 | |
| 2 | 05 | '&FILE'-FILE-ID | S9 (09) | | 7 | N | B | 9 | | S | | 1 | 4 |
| 3 | 05 | '&FILE'-DATA-ITEM-ID | S9 (09) | | 7 | N | B | 9 | | S | | 5 | 4 |
| 4 | 05 | '&FILE'-ITEM-DATASTAMP | 9 (08) | | 7 | N | B | 8 | | U | | 9 | 4 |
| 5 | 05 | '&FILE'-PROCESS-DATE | 9 (08) | | 7 | N | B | 8 | | U | | 13 | 4 |
| 6 | 05 | '&FILE'-NAME | X (32) | | 7 | C | D | | | U | | 17 | 32 |
| 7 | 05 | '&FILE'-COBOL-PIC | X (30) | | 7 | C | D | | | U | | 49 | 30 |
| 8 | 05 | '&FILE'-START-POS | S9 (09) | | 7 | N | B | 9 | | S | | 79 | 4 |
| 9 | 05 | '&FILE'-BYTES | S9 (04) | | 7 | N | B | 4 | | S | | 83 | 2 |
| 10 | 05 | '&FILE'-CHAR-NBR-IND | X (01) | | 7 | C | D | | | U | | 85 | 1 |
| 11 | 05 | '&FILE'-PRECISION | S9 (04) | | 7 | N | B | 4 | | S | | 86 | 2 |
| 12 | 05 | '&FILE'-EXPONEST | S9 (04) | | 7 | N | B | 4 | | S | | 88 | 2 |
| 13 | 05 | '&FILE'-NUM-FORMAT | X (01) | | 7 | C | D | | | U | | 90 | 1 |
| 14 | 05 | '&FILE'-SIGN-IND | X (01) | | 7 | C | D | | | U | | 91 | 1 |
| 15 | 05 | '&FILE'-LEVEL-NBR | S9 (04) | | 7 | N | B | 4 | | S | | 92 | 2 |
| 16 | 05 | '&FILE'-DEFEND-FILE-ID | S9 (09) | | 7 | N | B | 9 | | S | | 94 | 4 |
| 17 | 05 | '&FILE'-OCCURS-ITEMS | | | | N | GROUP | | | | | 98 | |
| 18 | 10 | '&FILE'-OCCURS-ITEM | S9 (09) | 1 | 7 | N | B | 9 | | S | | 98 | 4 |
| 19 | 10 | '&FILE'-OCCURS-ITEM | S9 (09) | 2 | 7 | N | B | 9 | | S | | 102 | 4 |
| 20 | 10 | '&FILE'-OCCURS-ITEM | S9 (09) | 3 | 7 | N | B | 9 | | S | | 106 | 4 |
| 21 | 10 | '&FILE'-OCCURS-ITEM | S9 (09) | 4 | 7 | N | B | 9 | | S | | 110 | 4 |
| 22 | 10 | '&FILE'-OCCURS-ITEM | S9 (09) | 5 | 7 | N | B | 9 | | S | | 114 | 4 |
| 23 | 10 | '&FILE'-OCCURS-ITEM | S9 (09) | 6 | 7 | N | B | 9 | | S | | 118 | 4 |
| 24 | 10 | '&FILE'-OCCURS-ITEM | S9 (09) | 7 | 7 | N | B | 9 | | S | | 122 | 4 |

COMPLETE DATA ITEM LIST

FIG. 3B

PROGRAM: XXXXXX  
DATE: 01/29/96

DATA ITEM IDENTIFICATION  
REPORT 1: COMPLETE DATA ITEM LISTING

FILE: 2   FILE SAMPLE DATA 2

| ITEM | LVL | NAME | PICTURE | OCCURENCE # OF | NBR/ DPTH | CHR TYPE | DIGITS | DECIMAL SHIFT | SIGN | DEPEND ITEM # | START POS | LEN |
|------|-----|------|---------|----------------|-----------|----------|--------|---------------|------|---------------|-----------|-----|
| 1  | 01 | '&FILE'-RECORD       |         |   | GROUP |   |   |   |   |   | 1   |    |
| 2  | 05 | '&FILE'-RUN-DATE     | X(06)   |   |       | C |   |   |   |   | 1   | 6  |
| 3  | 05 | '&FILE'-REC-TYPE     | X(04)   |   |       | C |   |   |   |   | 7   | 4  |
| 4  | 05 | '&FILE'-BRANCH       | X(05)   |   |       | C |   |   |   |   | 11  | 5  |
| 5  | 05 | '&FILE'-REF-BRANCH   | X(05)   |   |       | C |   |   |   |   | 16  | 5  |
| 6  | 05 | '&FILE'-REF-IE       | X(07)   |   |       | C |   |   |   |   | 21  | 7  |
| 7  | 05 | '&FILE'-USED-IE      | X(07)   |   |       | C |   |   |   |   | 28  | 7  |
| 8  | 05 | '&FILE'-SOC-SEC      | 9(09)   |   |       | N | 9 |   |   | U |   | 35  | 9  |
| 9  | 05 | '&FILE'-FILE-STATUS  | X(02)   |   |       | C |   |   |   |   | 44  | 2  |
| 10 | 05 | FILLER               | X(02)   |   |       | C |   |   |   |   | 46  | 2  |
| 11 | 05 | '&FILE'-IE-NAME      | X(030)  |   |       | N |   |   |   |   | 48  | 30 |
| 12 | 05 | FILLER               | X(01)   |   |       | C |   |   |   |   | 78  | 1  |
| 13 | 05 | '&FILE'-BIRTH        | 9(06)   |   |       | N | 6 |   |   | U |   | 79  | 6  |
| 14 | 05 | '&FILE'-BIRTH-X      | X(06)   |   |       | C |   |   |   |   | 79  | 6  |
| 15 | 05 | '&FILE'-HIRE         | 9(06)   |   |       | N | 6 |   |   | U |   | 85  | 6  |
| 16 | 05 | '&FILE'-HIRE-X       | X(06)   |   |       | C |   |   |   |   | 85  | 6  |
| 17 | 05 | '&FILE'-SEX          | X(01)   |   |       | C |   |   |   |   | 91  | 1  |
| 18 | 05 | '&FILE'-JOB-TYPE     |         |   | GROUP |   |   |   |   |   | 92  |    |
| 19 | 05 | '&FILE'-JOB-TITLE-CODE | X(01) |   |       | C |   |   |   |   | 92  | 1  |
| 20 | 05 | '&FILE'-JOB-CLASS-CODE | X(01) |   |       | C |   |   |   |   | 93  | 1  |
| 21 | 05 | '&FILE'-CLASS-NUM    | X(04)   |   |       | C |   |   |   |   | 94  | 4  |
| 22 | 05 | FILLER               | S9(08)V9|   |       | N | 9 | -1 | S |   |   | 98  | 5  |
| 23 | 05 | FILLER               | S9(08)V9|   |       | N | 9 | -1 | S |   |   | 103 | 5  |
| 24 | 05 | '&FILE'-SEC-DATE     | 9(06)   |   |       | N | 6 |   |   | U |   | 108 | 6  |
| 25 | 05 | '&FILE'-OPT-DATE     | 9(06)   |   |       | P | 6 |   |   | U |   | 114 | 6  |
| 26 | 05 | '&FILE'-COMM-DATE    | 9(06)   |   |       | P | 6 |   |   | U |   | 120 | 6  |
| 27 | 05 | '&FILE'-INS-DATE     | 9(06)   |   |       | D | 6 |   |   | U |   | 126 | 6  |
| 28 | 05 | '&FILE'-EARLIEST-DATE| 9(06)   |   |       | D | 6 |   |   | U |   | 132 | 6  |
| 29 | 05 | '&FILE'-COMM-HIRE-DATE | X(08) |   |       | C |   |   |   |   | 138 | 8  |
| 30 | 05 | '&FILE'-COMM-ITEM-DATE | X(08) |   |       | C |   |   |   |   | 146 | 8  |
| 31 | 05 | '&FILE'-LATEST-HIRE-DATE | X(08) |  |     | C |   |   |   |   | 154 | 8  |

COMPLETE DATA ITEM LIST

*FIG. 3C*

PROGRAM: XXXXXXX
DATE: 01/29/96

DATA ITEM IDENTIFICATION
REPORT 2: ADDITIONS, DELETIONS & CHANGES

PAGE 1

FILE: 3

| LVL NAME | PICTURE | OCCURENCE NBR/<br># OF DPTH | CHR TYPE | DIGITS | DECIMAL SHIFT | SIGN | DEPEND<br>ITEM # | START<br>POS | LEN |
|---|---|---|---|---|---|---|---|---|---|

A SINGLE "NEW" ITEM REPRESENTS AN "ADDITION". A SINGLE "OLD" ITEM REPRESENTS A DELETED ITEM. AN "OLD"/"NEW"
MATCHED PAIR REPRESENTS A CHANGE TO AN ITEM. NAME CHANGES ARE TREATED AS A DELETION WITH A MATCHING ADDITION.
CHANGES TO FILLER AND SLACX-BYTES ITEMS ARE RECORDED FOR PURPOSES OF ANALYSIS BUT ARE NOT SHOWN ON THE REPORT.
CHANGES IN POSITION ONLY ARE NOT REPORTED.

| | | | | | | | | | |
|---|---|---|---|---|---|---|---|---|---|
| OLD | 04 ITEM-1 | 9(3) | N | D | 3 | | U | 53 | 3 |
| NEW | 04 ITEM-2 | 9(3) | N | D | 3 | | U | 53 | 3 |
| OLD | 05 OLD ITEM | X | C | D | | | U | 225 | 1 |
| OLD | 03 SOME-THING | 9V9 | N | D | 2 | 3 | U | 1 | 2 |
| NEW | 03 SOME-THING | 999 | N | D | 2 | -1 | U | 1 | 3 |
| OLD | 05 NEW ITEM | XX | C | D | | | U | 225 | 2 |

* TOTAL OCCURENCES IS NOT SHOWN HERE FOR OLD ITEMS

DATA ITEM CHANGE REPORT

FIG. 3D

COL. 1: CHARACTERISTICS ID

COL. 2: TYPE OF DATA WHOSE "CHARACTERISTIC" IS REPRESENTED. "G"= GROUP CHARACTERISTIC (ALL INSTANCES TAKEN TOGETHER). "I" = TEXT, "N" =NUMBER, OR "D" =DATE

COL. 3: THE WAY IN WHITCH THE CHARACTERISTIC IS REPRESENTED. "C" =A ACOUNT OR "O" =AN OBSERVATION.

COL. 4: TYPE OF DATA USED TO REPRESENT THE CHARACTERISTIC. "C"=A COUNT, "I" =A TEXT STRING, N =A NUMBER, OR D =A DATE.

COL. 5: CHARACTERISTIC PROPERTY (THE WORDING USED HERE IS THE SAME AS IN USED IN THE MONITORING REPORTS – REFER TO THE SAMPLE REPORTS).

COL. 6: CHANGE. THE CODE INDICATES A "LEVEL OF IMPORTANCE*" WHICH CORRESPONDS TO A "DEGREE OF CHANGE*" CODE WITH A VALUE OF "2".

COL. 7: "QUANTITY CODE*" FOR MEASURING THE "LEVEL OF IMPORTANCE*" OF AN ABSENCE OF CHANGE".

COL. 8: THE "LEVEL OF IMPORTANCE*" OF AN ABSENCE OF CHANGE".

COL. 9: APPEARENCE OR DISAPPEARANCE OF CHARACTERISTIC WHEN COMPARED TO THE PREVIOUS GENERATION OF THE FILE, SHOWN AS A "LEVEL OF IMPORTANCE*" CODE.

* THE VALUES OF THE CODES, AND HOW THEY ARE USED, IS EXPLAINED IN THE "DETAILED DESCRIPTION OF THE INVENTION".

| COL. 1 | COL. 2 | COL. 3 | COL. 4 | COL. 5 | COL. 6 | COL. 7 | COL. 8 | COL. 9 |
|---|---|---|---|---|---|---|---|---|
| 0 | G | O | C | RECORD COUNT | d | 2 | d | a |
| 1 | T | C | C | LOW VALUES ONLY | d | 0 | a | d |
| 2 | T | C | C | "HIGH VALUES" ONLY | d | 0 | a | b |
| 3 | T | C | C | SPACES ONLY | d | 0 | a | d |
| 4 | T | C | C | ZEROS ONLY | d | 0 | a | d |
| 5 | T | C | C | A STRING OF REPEATED CHARACTERS (I SPACES) | d | 0 | a | b |
| 6 | T | C | C | UPPER CASE ALPHA CHARACTERS ONLY | d | 0 | a | c |
| 7 | T | C | C | UPPER CASE ALPHA CHARACTERS AND SPACES ONLY | d | 0 | a | c |
| 8 | T | C | C | UPPER CASE ALPHA CHARACTERS AND SYMBOLS ONLY | d | 0 | a | c |
| 9 | T | C | C | UPPER CASE ALPHA-NUMERIC TEXT ONLY | d | 0 | a | c |
| 10 | T | C | C | UPPER CASE ALPHA-NUMERIC TEXT & SPACES ONLY | d | 0 | a | c |
| 11 | T | C | C | DIGITS ONLY | d | 0 | a | c |
| 12 | T | C | C | DIGITS AND SPACES ONLY | d | 0 | a | c |
| 13 | T | C | C | DIGITS AND SYMBOLS ONLY | d | 0 | a | c |
| 14 | T | C | C | DIGITS AND NUMERICAL SYMBOLS ONLY (+-,.) | d | 0 | a | c |
| 15 | T | C | C | ZONED DECIMAL SIGNED NUMBER | d | 0 | a | b |
| 16 | T | C | C | ZEROS AND SPACES ONLY | d | 0 | a | b |
| 17 | T | C | C | ALPHA-NUMERIC TEXT ONLY INCLUDING LOWER CASE | d | 0 | a | b |
| 18 | T | C | C | UNPRINTABLE CHARACTERS | d | 0 | a | d |

*FIG. 4B*

| COL 1 | COL 2 | COL 3 | COL 4 | COL 5 | COL 6 | COL 7 | COL 8 | COL 9 |
|---|---|---|---|---|---|---|---|---|
| 19 | T | C | C | NULLS | d | 0 | d | d |
| 20 | T | O | N | MEDIAN CHARACTER STRING LENGTH IS | d | 0 | d | d |
| 21 | T | O | N | MEAN CHARACTERS STRING LENGTH IS | d | 0 | d | d |
| 22 | T | O | T | MINIMUM STRING: | b | 0 | d | d |
| 23 | T | O | T | MAXIMUM STRING: | b | 0 | d | d |
| 24 | N | C | C | VALID NUMERICS | d | 2 | d | d |
| 25 | N | C | C | INVALID NUMERICS | d | 0 | d | d |
| 26 | N | C | C | THE VALUE 0 | d | 0 | d | c |
| 27 | N | C | C | THE VALUE 1 | d | 0 | d | c |
| 28 | N | C | C | NUMBERS CONSISTING OF A REPEATED DIGIT | d | 0 | d | c |
| 29 | N | C | C | NEGATIVE NUMBERS | d | 0 | d | c |
| 30 | N | C | C | VALUES BETWEEN 0 AND 1 (NOT INCLUSIVE) | d | 0 | d | c |
| 31 | N | C | C | VALUES BETWEEN 1 AND 100 (INCLUDING 100) | d | 0 | d | c |
| 32 | N | C | C | NUMBERS WITH A DECIMAL COMPONENT | d | 0 | d | c |
| 33 | N | C | C | NUMBERS WITH 2 USED DECIMAL PLACES | d | 0 | d | c |
| 34 | N | C | C | NUMBERS WITH 3 OR MORE USED DECIMAL PLACES | d | 0 | d | d |
| 35 | N | O | N | MEAN VALUE IS | c | 0 | d | d |
| 36 | N | O | N | MINIMUM VALUE IS | c | 1 | c | d |
| 37 | N | O | N | MAXIMUM VALUE IS | c | 1 | c | d |
| 38 | D | C | C | VALID DATES | d | 2 | d | d |
| 39 | D | O | T | FORMAT OF VALID DATES | c | 0 | d | d |
| 40 | D | O | D | EARLIEST DATE IS | c | 0 | d | d |
| 41 | D | O | D | LATEST DATE IS | c | 0 | d | d |
| 42 | G | O | T | DATA TYPE | d | 0 | d | d |
| 43 | G | O | T | DOMAIN TYPE | d | 0 | d | d |
| 44 | G | O | C | NUMBER OF UNIQUE VALUES | d | 0 | d | d |
| 45 | G | O | T | DATA ITEM SEQUENCE | d | 0 | d | d |
| 46 | G | O | T | UNIQUENESS OF ORDERED ITEMS | d | 0 | d | d |

FIG. 4C

METHOD FOR DETERMINING IF DATA ITEM CHARACTERISTICS IN PERIODICALLY UPDATED AND REPLACED FILES HAVE UNEXPECTEDLY CHANGED

FIELD OF THE INVENTION

The present invention relates generally to data processing and more particularly to a method for verifying computer generated data to determine if periodically updated or replaced files have data items which have changed in an unexpected manner.

BACKGROUND OF THE INVENTION

The volume of information that is processed and stored by computer systems continues to expand at a remarkable pace with "desktop" personal computers and other small computer systems forming the most visible component of this growth. Most large corporations, however, still rely on mainframe systems for most of their basic data processing needs, even though the smaller systems have become faster and include computer storage media which can accommodate more data than in the past. This is because mainframe systems still hold a substantial advantage over small computer systems in terms of speed, volume of storage, and above all, capacity for large volume throughput. Accordingly, mainframe systems continue to meet data processing requirements that the smaller computer systems cannot match.

The proliferation of personal computers in the mass market has forced publishers of personal computer software to improve their products, making data on these small machines easier to access. But the benefits realized in the mass market in terms of improved personal computer software, have not been seen in the area of mainframe computer software despite the fact that mainframes, and their associated software systems, have been around for far longer. Hence, data in mainframe systems is often far more difficult to access than data on personal computers, making it harder to see the results of a computer process. One of the main reasons mainframe data is more difficult to access is due to the nature of the processing done on these differently sized hardware platforms. More specifically, the batch data typically processed by mainframe systems is far harder to access than the online data typically processed by personal computers as will be explained below.

Data processing can be divided into two classes: online and batch. Online processing is geared towards the immediate resolution of individual transactions, whereas batch processing handles large quantities of transactions as a group. Human interaction with computers is invariably through online processing, while large scale processing is most often handled in the batch mode.

Since batch data processing involves large quantities of data, the detection of errors in the data involves examining large amounts of the data. In online data processing, however, each item of information or data results, at least in part, from an interaction with a person and thus, errors in the data are more easily and likely to be detected. This personal interaction or "manual oversight" provides a degree of quality control. It should be noted, however, that large scale manual data entry may be regarded as a "batch" process in this context. Although the data is processed though human interaction, the processing is nonetheless mechanical in nature since data entry clerks generally do not read what they are typing.

In any case, when batch systems encounter undetected errors in the data, the process may or may not respond to the error. In the case where the process is affected by the error, it will either notify the user of a problem in a controlled fashion (if the possibility of that type of error was foreseen) or the process will be forced to a halt (when the error is of an unforeseen nature). The error in the data may also go undetected allowing the process to continue to completion, so that the incorrect data will not be immediately obvious.

There are many ways in which errors can be introduced into computer data. For example, errors can be introduced into computer data from "bugs" in the computer program, from external sources, from the operating system's environment, and from errors caused by the computer itself, just to name a few.

With regard to data errors which originate from bugs in computer programs, virtually all nontrivial computer programs contain some bugs. Careful design and exhaustive testing will typically identify most of the bugs, but some bugs will undoubtedly remain latent in any system, ready to affect the process when some new combination of circumstances arises in the data. Systems made up of suites of programs that work together, are prone to bugs in exactly the same way, since such software systems are in effect just large programs.

With regard to data errors which originate from external sources, computer systems which obtain information from outside sources are subject to errors from unexpected changes in the data from those external sources. Although program bugs are often blamed for such errors, many times these errors result from a failure of the personnel who are responsible for the system which produces the data to communicate with the personnel who are responsible for the system which receives the data.

As stated earlier, data errors can also be caused by the system environment. IBM's Multiple Virtual System (MVS) operating system may be responsible for more large scale batch data processing than any other system software. Unlike personal computer software which "crashes" frequently, MVS installations, which typically support hundreds or even thousands of simultaneous batch and online processes, "crash" very rarely. When a MVS operating system does crash, the crash is usually confined to individual processes or subsystems. However, MVS does have some serious limitations which relate to job control language (JCL), the programming language that links programs to the data that the programs access. The JCL is difficult to test since it has limited parameter substitution and inadequate features for process modularization. MVS also has an inflexible storage allocation scheme, which requires that storage requirements be determined in considerable detail in advance. In addition, MVS tends to require a great deal of manual (operator) intervention.

With regard to "computer errors," all such computer errors result either from hardware failures, or manual mistakes. When computer errors slip through undetected, they are generally manual in origin.

Present computer data error detection methods are generally geared towards ensuring that data moved from one place to another, arrives intact. This is generally accomplished by creating some kind of redundant representation of the data, and using the extra information to compare the original data to the copied version. However, such methods cannot detect errors in the original data. More specifically, errors created by software bugs are not detectable by present methods because such errors originate in the program itself and not in the failure of the hardware to correctly execute the program instructions.

It is, therefore, an object of the present invention to provide a data verification method for detecting errors which have been introduced throughout the entire computer system.

SUMMARY OF THE INVENTION

A method for verifying computer generated data in periodically updated or replaced files to determine if data item characteristics in the files have changed in an unexpected manner. The method involves the steps of selecting a first version of each of the data item characteristics and selecting a second subsequent version of each of the data item characteristics. The first version of each of the data item characteristics and the second subsequent version of each of the data item characteristics are analyzed to produce first and second statistical profiles. The first and second statistical profiles of each of the data item characteristics are then compared to each other to determine if any of the data item characteristics have changed in an unexpected manner.

BRIEF DESCRIPTION OF THE DRAWINGS

A more complete understanding of the invention may be obtained from consideration of the following detailed description in conjunction with the accompanying drawings in which:

FIG. 2C is a flow chart depicting a preferred approach for performing the manual online maintenance task as it relates to the online file information maintenance processing step of FIG. 2B;

FIGS. 3B and 3C depict two sample report pages produced by the data definition processing step of the present method;

FIG. 3D depicts a second sample report produced by the data definition processing step of the present method, which identifies data definition changes since the last file analysis;

FIGS. 4B and 4C show a table of statistics that are collected in the first task and reported in the second task of the final analysis processing step of the present method.

DETAILED DESCRIPTION OF THE INVENTION

Figure 1:
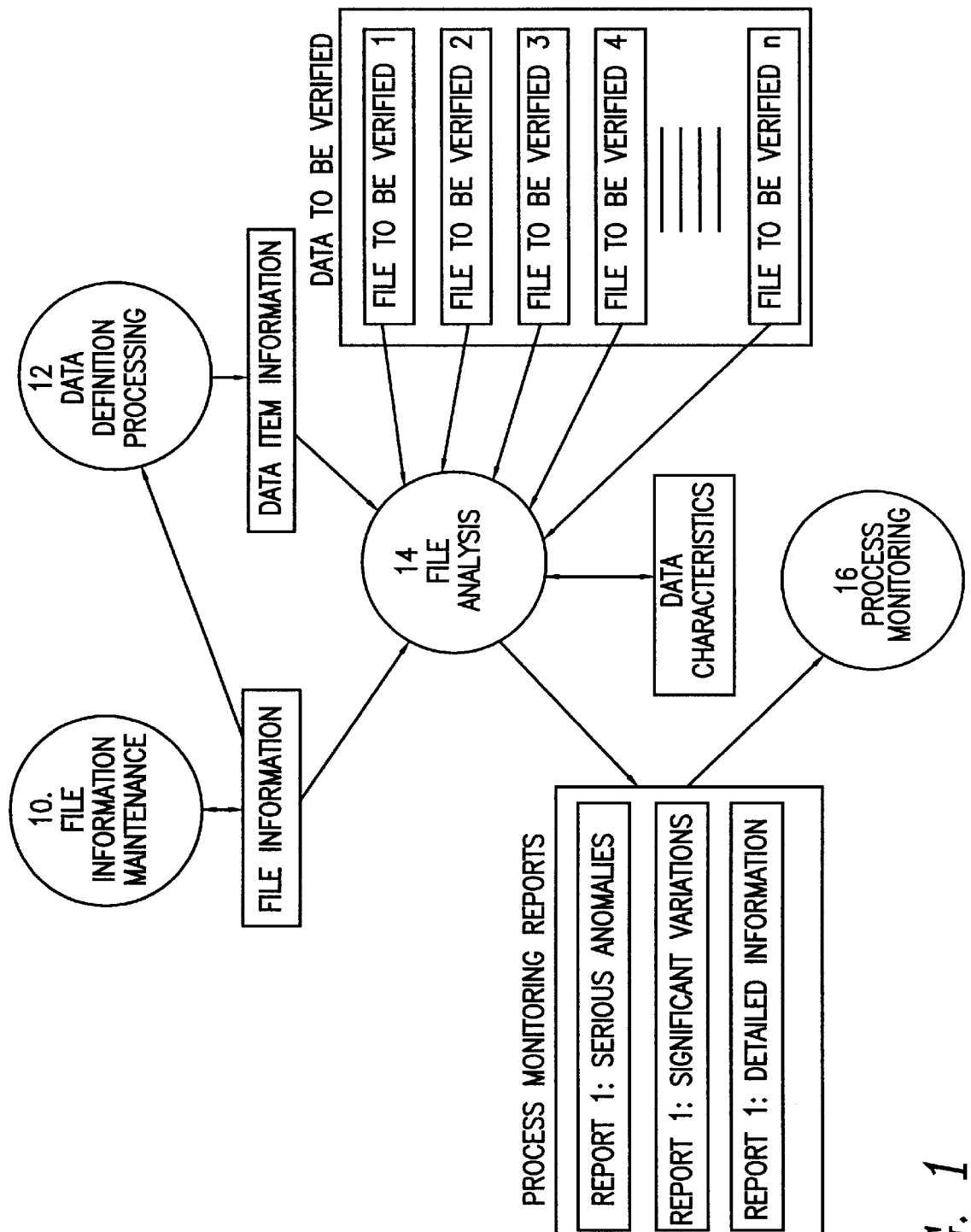
FIG. 1 is a data flow diagram of the data verification method of the present invention.

The data verification method of the present invention applies "reasonableness checking" to the data throughout the system. "Reasonableness checking" operates to identify gross errors and unreasonable results in computations. Although most program or software system bugs result in "gross" errors, such errors are often hard to find in vast computer files.

Computer files consist of multiple records which are divided into fields, where each field represents a data item. Conceptually, each file consists of a table with rows and columns (which is in fact the terminology of the relational database discipline). Generally, batch computer processes tend to operate in the same way on every record of the same type, and in the same way on each item in a column of a file, although there are exceptions to this. As a result, programming bugs tend to produce errors which propagate through many records. Although these computer errors tend to be enormous, such errors are often lost in the even more enormous volume of data being processed in any large mainframe system. The method of the present invention makes it possible to find the erroneous data in the large number of records that are affected.

In order to measure the reasonableness of data in a file, the verification method of the present invention establishes a standard or "baseline" of reasonableness for every data item, in every file that is to be verified. Such a "baseline" is established in the present invention by picking any version of the data in a system, and using that as the yardstick for evaluating the next generation of the same data. When in use, the verification method of the invention produces statistics for each data item and compares the data to the statistics produced for the previous generation of the data. Although the individual data item instances will change substantially, statistics representing all of the instances of a data item in a file, are far more stable. Generally, only a small percentage of the data items in a file exhibit a radical change from period to period. Accordingly, the verification method of the present invention reduces the number of data items in a system that will need special attention to a manageable quantity.

The present invention evaluates the contents of computer files. It employs a generic approach which is driven by record descriptions (a.k.a. record layouts) which may be created for use in programs which read from or write to these files. This software may be used to profile the contents of files, monitor changes, detect likely areas of erroneous data, generate data domain meta-data, and verify "migrated" information in parallel implementations and similar uses.

The generic design of the present invention eliminates programming errors inherent in customized solutions to the foregoing problems, allows for the immediate implementation of solutions to said problems, and provides for a thorough evaluation of all file contents.

At its core, the present invention consists of two main parts. The first part compares record layouts over time to determine if they have changed in ways that would affect the contents of files. The second part performs a generic data item evaluation that obtains a description of the contents of every data item that is identified in the record layouts (a.k.a. data item characteristics), and compares these characteristics over time (where historical information is available).

The complete methodology involves two more peripheral components. One is the maintenance of a file information list that defines the set of files that are to be evaluated, and identifies their record layouts. The second is a process which monitors the results of the other steps. This may vary in sophistication from simply reviewing printed reports produced in the other processing steps, to accessing the same information via an online system that is updated in real time.

The present invention is intended to be primarily used as a tool for applications developers, systems managers, database administrators and the like. In this regard it is mainly a tool for systems professionals rather than an end-user application. The present invention has many practical uses including, but not limited to, monitoring the accounts of financial institutions such as banks or brokerage houses, or monitoring the accounts payable or accounts receivable of businesses, or monitoring the processing of insurance claims by insurance companies.

An exemplary embodiment of the verification method of the present invention will now be described as it applies to an IBM mainframe world, as used for the IBM MVS and Time Sharing Option (TSO) systems. Accordingly, the description which follows will refer to the way data and processes are handled in those IBM systems. Programming language references will be specific to COBOL unless otherwise noted. It should be understood, however, that the verification method of the present invention as will be described is a generic process which can generally be implemented in any software environment. More specifically, the processing steps used in the present method as will be described, can be used in the same way for a variety of data storage or software schemes. Since the processing steps of the present method are generic, the process steps do not have to be modified for each file because the steps modify themselves, thereby functioning more reliably and objectively. Reliability in a data verification method is vital since the process steps should not themselves create errors. Furthermore, objectivity is also important in a data verification method because errors must be checked both in places where you would expect them to occur, and in places where you would not expect them to occur.

Referring to the data flow diagram of FIG. 1, the basic processing steps of the verification method of the present invention are shown. As can be seen, the verification method is divided into four steps which consist of a file information maintenance (FIM) processing step 10, a data definition (DD) processing step 12, a file analysis (FA) processing step 14, and a process monitoring (PM) step 16.

The FIM processing step 10 maintains a minimal amount of file information that tells the verification system which files are to be analyzed, and where to find the information that defines the contents of each file. Although this step is performed manually, it involves only a small amount of information for each file. Furthermore, such data is likely to change very little from one period to the next.

The DD processing step 12 derives data item information from the file information maintained in the FIM processing step 10. More specifically, the DD processing step 12 determines how each file should be analyzed, as well as the variations in the file definitions since the last run. A complex data processing system may contain thousands of separately defined data items. The DD processing step 12 separately reports just those items that are to be changed for the next file creation/update. Such a report may be reviewed for any unexpected changes.

The FA processing step 14 is executed for each file as soon as possible after it is created or updated. This step evaluates the aggregate statistics on each data item, and responds appropriately to the changes (or lack thereof) as directed by the processing control parameters.

The PM processing step 16 monitors the verification process as it proceeds by receiving the information in the reports which are maintained in the FA step. The information thus gathered is posted to a set of 3 online reports (consisting of a serious anomalies report, a significant variations report and a detailed information report. Each report shows the processing timeline, interspersed with a record of what the data looks like and how it has changed. The three reports differ in the level of detail reported about each process). The staff monitoring the file processing only have to watch the serious anomalies report, using the more detailed reports to resolve specific issues. The tools provided by the present method simplify the task of process monitoring which must be performed in any event.

In other embodiments of the present method, an online process monitoring "ticker" application can also be provided. Such an online process monitoring step would alert users to anomalies in the data and provides for easy "drill down" access to the more detailed information, through a more convenient interface.

As described earlier, the information provided by the FIM processing step 10 tells the rest of the processing steps of the verification method how to interpret the files that are to be verified. The FIM processing step 10 provides one entry per file consisting of rudimentary identifying information for the file and its record layouts. The file is identified by a descriptive name and a formal identifier. The record layout may require slightly more complex identifying information.

Figure 2A:
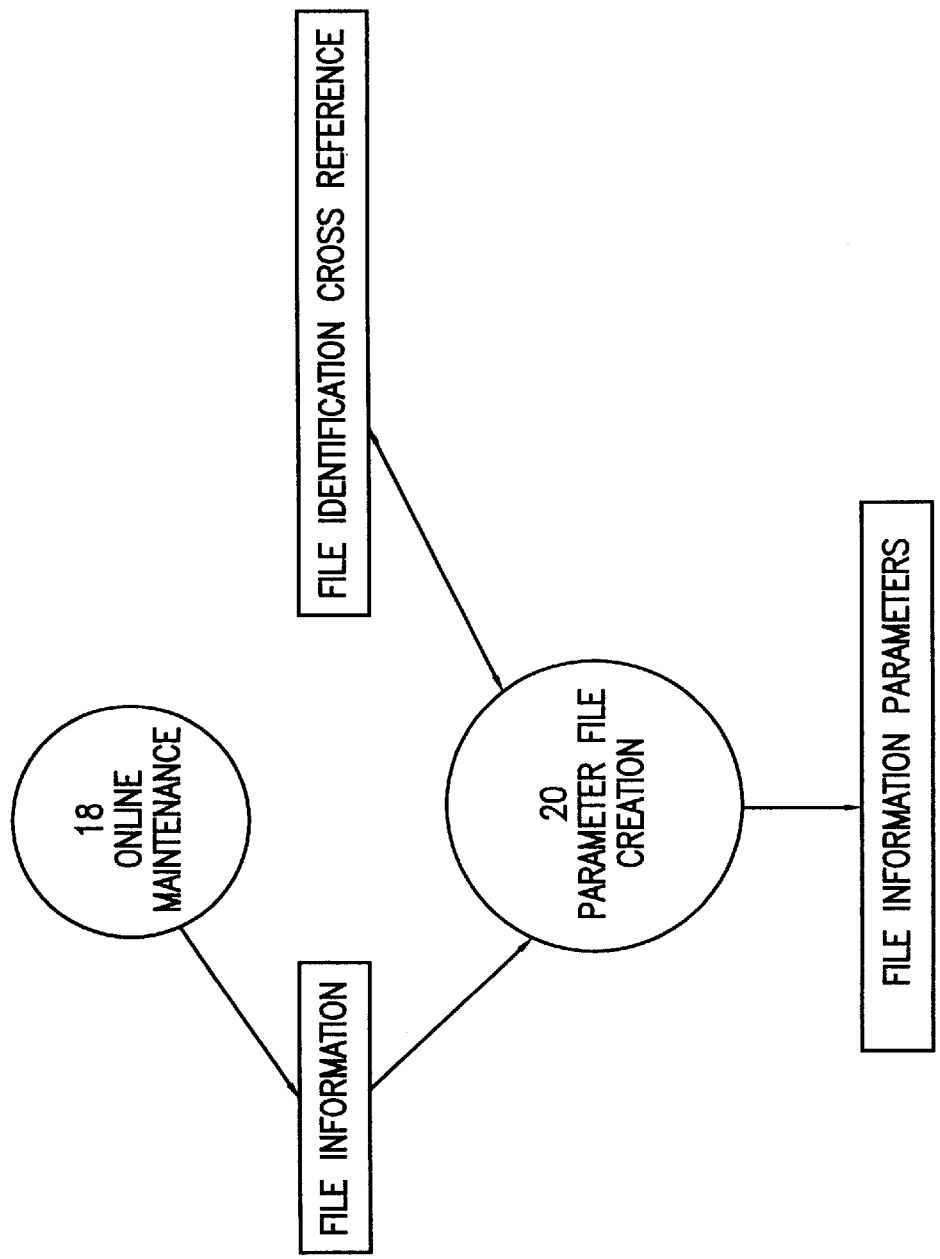
FIG. 2A is a data flow diagram of the file information maintenance step as a batch process.
Figure 2B:
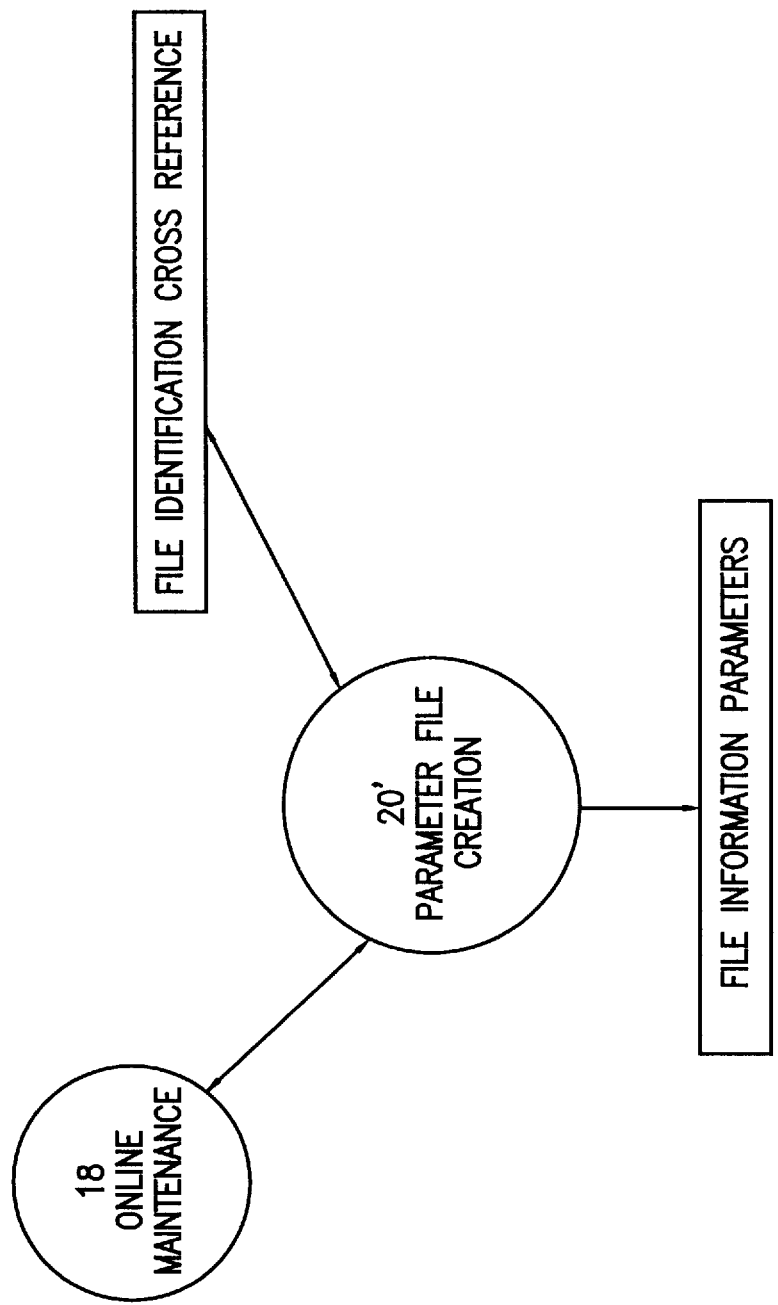
FIG. 2B is a data flow diagram of the file information maintenance step as an interactive online process.

Referring to FIGS. 2A and 2B, collectively, data flow diagrams further detailing the FIM processing step of the present method are shown. In particular, the data flow diagram of FIG. 2A embodies the FIM processing step for batch data processing while the data flow diagram of FIG. 2B embodies the FIM processing step for online data processing. As shown in both FIGS. 2A and 2B the FIM processing step consists of the task 18, 18' of manually maintaining the file information referred to herein as online maintenance, and then the task 20, 20' of assigning a unique and consistent File ID to the manually maintained file information referred to herein as parameter file creation. In the FIM processing step for the online version of FIG. 2B, the first task 18' of the step (manual maintenance of the file information) invokes the second task 20' (assigning File IDs) as each file information record is maintained. However, in both versions of the FIM processing step of FIGS. 2A and 2B, the objective is the same, to maintain a consistent means of identifying files, so that the files may be compared across time.

A preferred approach for manual online maintenance task 18' as it relates to online file information maintenance processing step of FIG. 2B is shown in the flow chart of FIG. 2C. As can be seen, the first box 22 of the flow chart represents the warnings and notifications which are provided to a user in response to said user's actions, such as error messages, confirmations of changes and notification of deletions.

The first group of items which the online entry procedure prompts the user for are the "File Identification" items 24 such as the "File Name (Descriptive Name)" and "DSN (Use "0" for GDGs)." The "File Name (Descriptive Name)" is the name of the file in plain language. It serves as an essential piece of system documentation. The "DSN (Use "0" for GDGs)" is the "data set name" and is the "formal" name used by the method to "catalogue" the file. The "File ID" that is subsequently assigned to each file reference is based primarily on the DSN. The reason for substituting a numerical key in place of the DSN is mainly as a space and time saving measure. A DSN (on the MVS system) can be 44 bytes long, the binary packed numerical file ID occupies only 2 bytes. Another reason for using a File ID alias involves the situation where a file's DSN has to be changed. In such a situation, the File ID can be reassigned independently of the DSN, thus maintaining the continuity of references across file generations. If the file is a generation data group (GDG) the user will follow the DSN with "(0)" to indicate the current version. Entering the DSN of an already specified file entry will cause that entry to be retrieved for maintenance purposes.

The next group of items which the online entry procedure prompts the user for are the "Record Layout" items 26 such as "Program File/Copy Library DSN," "Copy Member (Where Applicable)," and "Library Type ("P"-Panvalet, blank for other files)." The "Program File/Copy Library DSN" is the DSN of the file containing the record layout information. The "Copy Member (Where Applicable)" is a member name which further qualifies the record layout. This is generally required in most cases since the file will most probably be of a "library" structure. The "Library Type ("P"-Panvalet, blank for other files)" are codes which indicate a third party "library" maintenance system such as Panvalet. If omitted, a default "library" type of "partitioned data set" (PDS) will be assumed.

The next group of items which the online entry procedure prompts the user for are the "Identification for files with multiple record layouts" items 28 such as "Record identifier data item name" and "Record identifier data item value." The "Record identifier data item name" is the name of the data item, common to each record layout, that contains a value used to identify which record layout describes the current record. It is used in those cases where the file has multiple alternative record layouts. The "Record identifier data item value" is the value (i.e. contents) of the named data item that identifies it as belonging to the record that has been identified above.

The last group of items which the online entry procedure prompts the user for are the "Control Information" items 30 such as "System Generated File ID," "Confirm the change of File DSN (Y)," and "Confirm Deletion (D)." The "System Generated File ID" item is an alias for the DSN and as such may be used to retrieve an entry that requires maintenance. Additionally this item may be specified in conjunction with the DSN in order to specify a DSN change. The "Confirm the change of File DSN (Y)" is used with the "System Generated File ID" field described above and enables a user to specify that a DSN is to be changed for a file whose File ID number is specified. In most cases the DSN serves as the primary means of identifying a file, whereas the system generated File ID serves as a system generated alias. Usually, the last thing that one would want to change about any file is it's DSN. However, this data entry item, when used with the "System Generated File ID" field (see above) will enable users to specify that a DSN is to be changed for a file whose File ID number is specified. The "Confirm Deletion (D)" allows users to delete file information entries.

The preferred approach for manual online maintenance task 18 as it relates to performing the batch file information maintenance processing step of FIG. 2A is identical to the approach described above for the online file information maintenance processing step of FIG. 2B, except that the "Warnings and Notifications" 22 and "Control Information" items 30 are omitted.

Referring again to FIGS. 2A and 2B, the next task 20, 20' of the FIM processing step involves assigning a unique and consistent File ID (parameter file creation) to the manually maintained file information. The system assigns a File ID based on the DSN. A master list of DSNs is maintained by the process and is hereinafter referred to as the "File Identification Cross Reference" file in FIGS. 2A and 2B. New DSNs are added to this list and are assigned the next available number. File ID numbers are assigned incrementally starting with 1. Using a 4 byte binary integer will provide for a billion unique DSNs. File ID cross reference items are never deleted, so that if a file is removed from the list and then later re-added, it will regain it's former unique ID number. A date stamp is preferably added to the File ID cross reference items at the same time they are assigned a number for auditing purposes although in other embodiments of the present method, the date stamp can be omitted if desired.

With regard to the all-online embodiment of FIG. 2B, the user is provided with the option of reassigning File ID numbers in the (unusual) circumstance of a DSN change.

Figure 3A:
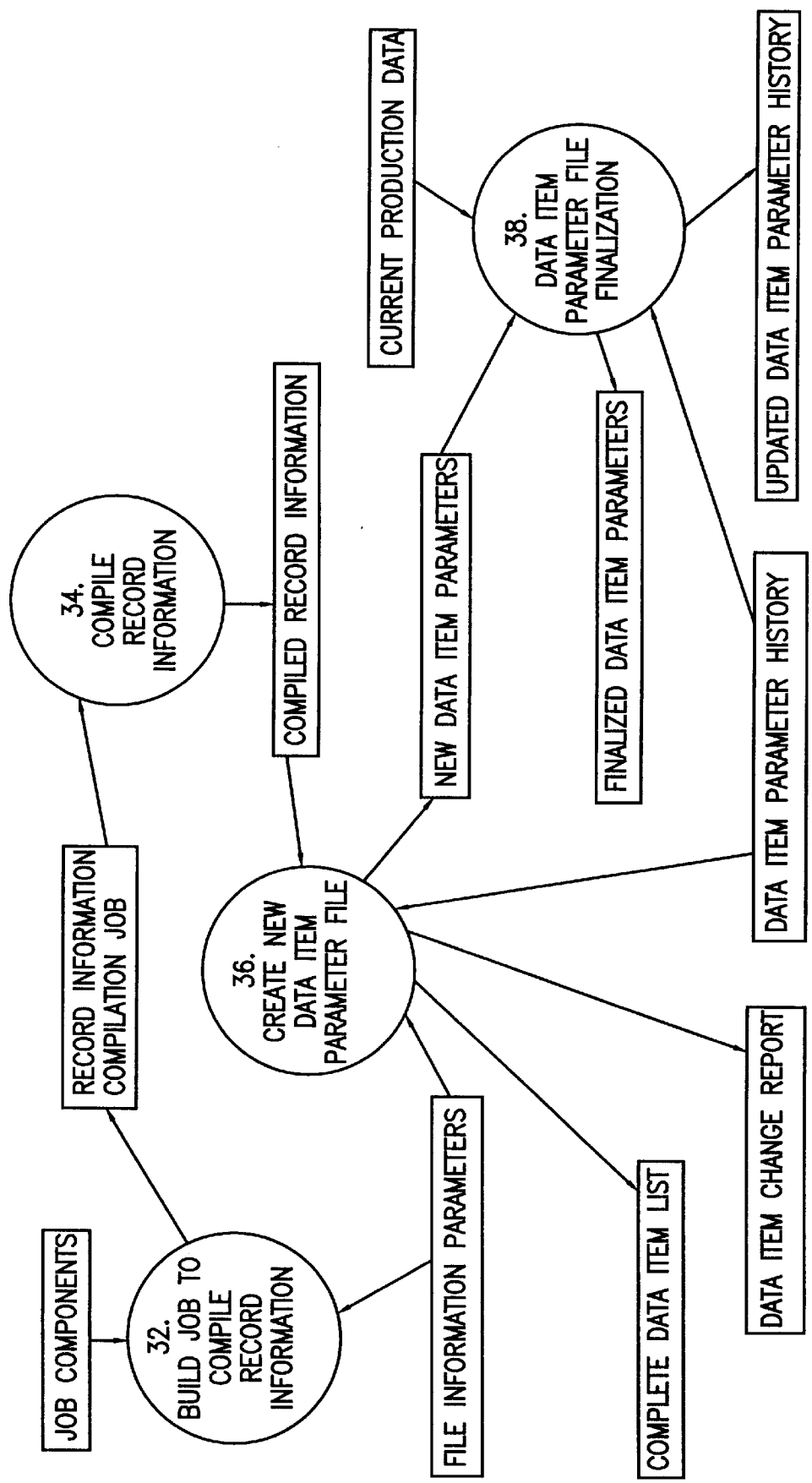
FIG. 3A is a data flow diagram of the data definition processing step of the present method.

Referring to FIG. 3A, a data flow diagram further detailing the DD processing step of the present method is shown. The DD processing step uses the file information obtained in the previous step described above to derive the data item parameters used to perform the subsequent processing step of file analysis. The DD processing step ensures that data items are correctly matched across time in the same way the FIM processing step ensures continuity of file references from one period to the next.

The DD processing step involves: the task 32 of building a job to compile record information; the task 34 of executing the job to compile the record information; the task 36 of creating a new data item parameter file; and the task 38 of finalizing the data item parameter file.

The first two tasks, 32 and 34, of the DD processing step essentially involve gathering the record layout information together. The third task 36 of the DD process organizes this data into a uniform structure and matches data item names across time periods. The last task 38 of the DD process "finalizes" the data for the file analysis process.

With regard to the first task 32 of the DD processing step, there may be any number of record layouts which have to be analyzed in this process. Furthermore, the record layouts may be stored in a variety of different ways, in a variety of file formats, or in proprietary "library" maintenance products. The record layouts may be embedded in program code.

The first task 32 of the DD processing step involves using the record layout identifying information, as entered in the FIM processing step, and assembling the record layouts into a single file. This is accomplished by building a separate job that assembles the record layouts into the single file. Additional job control statements are contained in the "Job Components" file(s). These "Job Components" can easily be modified to meet the processing standards of any particular data processing facility.

The job, as constructed above, is then executed in task 34 to produce in one file a complete listing of all of the record layouts, interspersed with file header records. Each record layout is identified with its file since the same data item names can easily appear in more than one file. If record layouts cannot be found, the process is stopped and the appropriate error message(s) inform the user that record layouts cannot be located. When this occurs, the user is instructed to correct either the record layout (which may be in the wrong place) or the file information itself It should be understood, that although this method for assembling the record layout information is preferred, other methods for assembling the record layout information are contemplated by the present invention.

In the third task 36 of the DD processing step, the source record layouts are interpreted and the record layout parameters are stored in a standardized format. This task in many ways mimics the work done by a computer language interpreter or compiler. The third task 36 also compares the new data item list to the previous data item list which is stored in the "Parameter History" file. In the third task 36, the new list is not added to the "history" at this point, thereby allowing for the process to be reviewed, corrected and rerun.

FIGS. 3B and 3C depict two sample report pages produced by the DD processing step of the present method. As can be seen from these two reports, the data that is derived from the record layouts follows the format required for COBOL programming. It should be understood, however, that similar information can be derived from code used in other data processing languages, such as "declarations" in PL/I, "formats" in SAS, "unpack" statements in perl, and the like. FIG. 3D depicts a second sample report produced by the DD processing step of the present method, which identifies data definition changes since the last "file analysis."

The items which make up the report of FIGS. 3B and 3C are described hereinafter. Every data "item" is assigned an item number which remains constant from period to period. (Note that the item numbers that appear on the report, are for reference only.) Only items with a non-zero length, as shown in the last column, are stored.

The term "Lvl" is the COBOL level number. The actual level number is important since it may form part of the definition of a subset of a record layout that is to be used to define a file's structure. (Some COBOL compilers reassign level numbers in the compiler since only their relative values are normally of importance in defining a data structure.)

The term "Name" is the primary identification of data items within a file and is, therefore, of great importance. It is subsequently replaced in the process with an alias, the data item number, to save space and improve performance. If a data item's name is changed, this will be handled as a deletion of the original item, and the addition of a new item. It is possible to provide an override mechanism to force a renamed item to reclaim the ID associated with its original name, but the benefit of such a mechanism is questionable. Data item names are rarely changed in batch processing, without there being some accompanying change in the way that the data is being handled, which means that the data item will require special attention in any event. Note that the data item names shown in the sample reports have substitutable qualifiers ("&FILE"). Unlike a COBOL compiler, these qualifiers are processed as they appear in the source. This is important since this makes the data item name an absolute reference. Once they have been replaced by a substitute, the original name is lost. Filler items and slack bytes are noted explicitly with names "FILLER" and "SLACK-BYTES", respectively. Internally, and in subsequent reporting, the data item names are differentiated from one another by the addition of the start position and length (in bytes) of the item. For example: "SLACK-BYTES (123:3)"

The term "Picture" refers to the COBOL picture retained in order to provide additional data item documentation in the various reports.

The terms "Occurrence" and "#" refer to the occurrence number of a repeated data item.

The terms "Occurrence" and "of" refer to the total number of occurrences.

The terms "Occurrence" and "Dpth" refer to the fact that in COBOL, repeated data items may be nested to 7 levels. The number shown under this heading indicates the current level of "OCCURS" nesting.

Occurrence numbers form part of the data item key. For COBOL, this means that each data item has up to 7 additional numbers which together identify occurrences of a data item, each of which will be assigned a separate data item ID. Note that in the report of FIG. 3B, each occurrence is listed separately.

The term "Nbr/Chr" relates to "N"=number data, or "C"=character data, as indicated by the "picture" or "usage" clause. Group items are noted explicitly. Group items are only of interest in defining the data structure but are not used in the remainder of the process since they do not themselves contain data.

The term "Type" refers to the type of data representation. Character data is always "D" for display. Numbers may be: "D" for display (including zoned decimal); "P" for packed decimal; "B" for binary; "1" for a 4 byte internal floating point (COMP-1); and "2" for an 8 byte internal floating point (COMP-2).

The term "Digits" refers to the number of digits which are accommodated (i.e. overall numeric precision).

The term "Decimal Shift" refers to the equivalent of the power of ten that the number is to be multiplied by. A negative amount moves the decimal point to the left, and a positive amount moves the decimal point to the right. The decimal shift is omitted for integers.

The terms "Sign" and "U" refer to unsigned items, and the term "S" refers to signed items.

The phrase "Depend Item #" refers to the "Item" number (from the first column) which indicates the number of occurrences for the variable occurrences of the data item shown. As in the case of the "Item" column, the numbers that appear on the reports refer back to the "Item" numbers in the first column. The recorded data item history will contain the actual data item ID.

The phrase "Start Pos" refers to the position in bytes of the first byte of the data item. Implicit record size information for variable sized records, is not included. Thus, "Start Pos" and "Depend Item #" are mutually exclusive by definition.

The term "Len" refers to the length in bytes of the data item.

The "New Data Item Characteristics" as used in the report in FIGS. 3B and 3C, contain data item ID numbers carried forward from a previous report. All discrepancies between the new data and the previous period data are listed in the "Data Item Change Report", as shown in FIG. 3D. A single "New" item represents an "addition." A single "Old" item represents a deleted item. An "Old/New" matched pair represents a change to an item. Name changes are treated as a deletion with a matching addition. Changes to FILLER and SLACK-BYTES items are recorded for purposes of analysis but are not shown on the report. Note that the columns of FIG. 3D are virtually identical to those in the report of FIGS. 3B and 3C. The major difference is that the "item" number in the first column of the report of FIGS. 3B and 3C is replaced in FIG. 3D with an "Old/New" indicator.

Reviewing the "Data Item Change Report" of FIG. 3D provides a user with the salient features of the record layouts, by showing only the changes. The report of FIG. 3D is likely to be far smaller than the "Complete Data Item List" report of FIGS. 3B and 3C which have an entry for each data item defined for each file, and is likely to contain hundreds of pages in a typical implementation.

The entire method from FIM processing step 10 through the third task 36 of the DD processing step may be rerun as necessary until the user is satisfied that the file information parameters and record layouts are correct.

Referring again to FIG. 3A, the final or fourth task 38 of the DD processing step finalizes the information as is described below. The fourth task 38 of the DD processing step involves using the "New Data Item Parameters" for actual file verification, once the data is correct. In particular, the fourth task 38 of the DD processing step "stamps" each data item parameter with the new "production" date, and adds the new parameter information to the "Data Item Parameter History" (thereby creating the "Updated Data Item Parameter History" as shown in the diagram). The "Finalized Data Item Parameters" can now be used to drive the rest of the process. The fourth task 38 is preferably performed in the production schedule as a prerequisite to the creation or updating of the files that are to be verified. The assumption is made that the "production date" is readily available on the system. If this is not the case, then the "production date" can easily be provided as part of the fourth task.

The FA processing step as described earlier, is executed for each file as soon as possible after the data set is created or updated. The FA processing step evaluates the aggregate statistics on each data item, and responds appropriately to the changes (or lack thereof) as directed by the processing control parameters. The FA processing step is run repeatedly, once for each file that requires verification. In the case of multiple record layouts in a file, it is run separately for each type of record that each record layout describes.

It is preferred that the FA processing step be run as soon as possible after the creation of the file, so that problems can be identified immediately. Accordingly, if action needs to be taken, then it can be taken quickly in order to prevent the contamination of other systems.

Figure 4A:
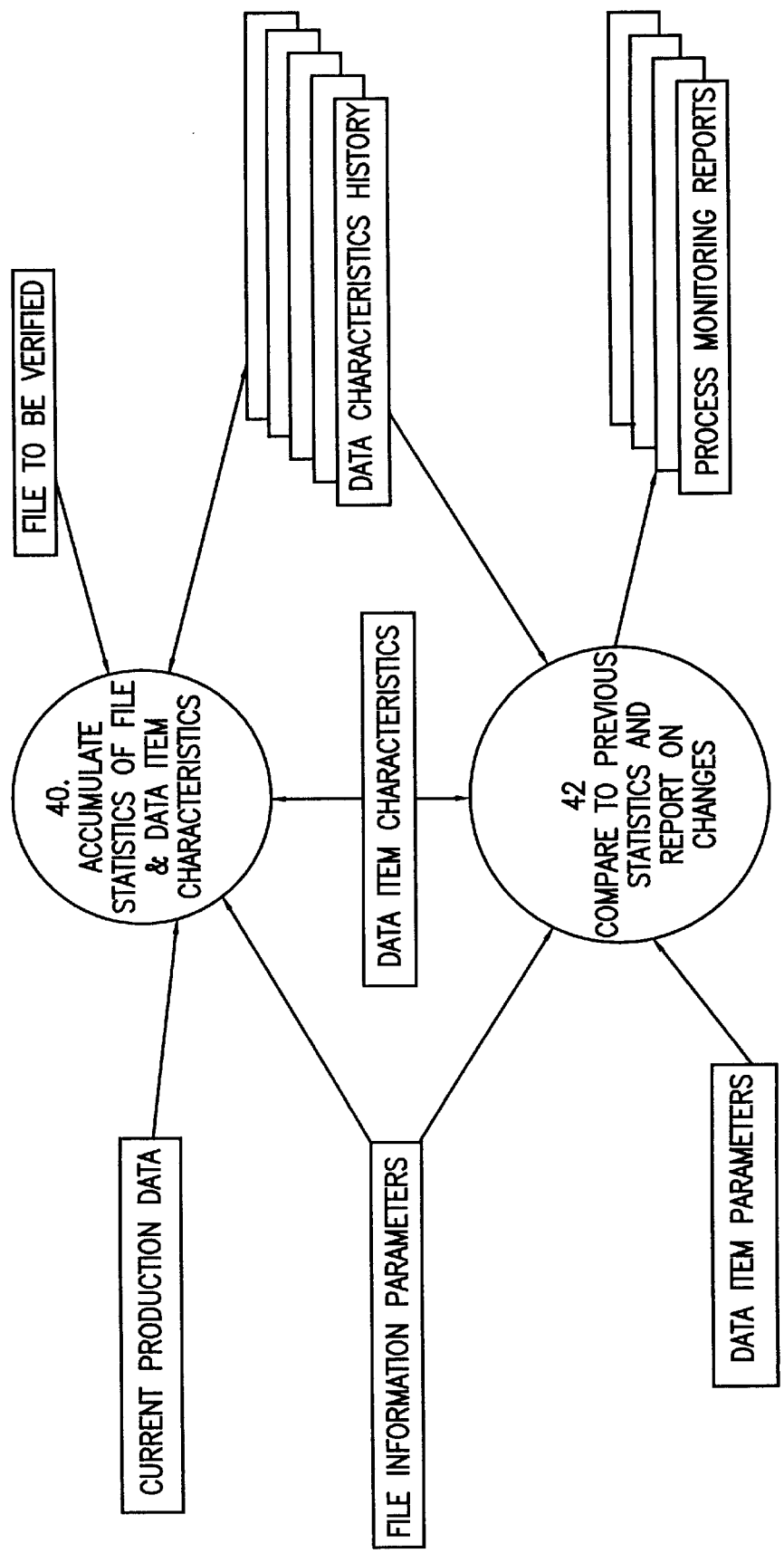
FIG. 4A is a data flow diagram of the file analysis processing step of the present method.

Referring now to FIG. 4A, a data flow diagram further detailing the FA processing step of the present method is shown. As can be seen, the FA processing step performs the task 40 of accumulating statistics on file and data item characteristics by evaluating the aggregate statistics on each data item and then performs the task 42 of comparing the data item characteristics to previous statistics and reports on the changes found.

During the first task 40, as each file is read, the "Current Production Date", the "File Information Parameters" (produced by the FIM processing step), and the "Data Item Parameters" (produced by the DD processing step) are used to analyze the data.

The "Current Production Date" serves, in part, to ensure that the "Data Items Parameters" have been finalized for the current production period. An override parameter is provided so that historical file analysis data can be added for the verification of files that are being added to the process for the first time. Previous period file analysis are not mandatory for the initial verification. If omitted, they will accumulate over time.

The data is analyzed using an algorithm to produce statistics on file and data item characteristics. The data item characteristics provide relatively little information. What the data item characteristics do provide, however, are: 1) a name by which the data item may be identified; 2) where the data item is located in each record; and 3) how to evaluate numeric data items.

Other known characteristics about the data are combined with the data item parameter information from above, to derive file and data item characteristic values from each file.

FIGS. 4B and 4C show a table of statistics that are collected in the first task, and reported on in the second task of the FA processing step. As this table suggests, the process is fairly generalized allowing for new items to be added to the table. Some of the items however are interdependent and will require specific (i.e. non-generalized) processing. Each data item characteristic shown in the table of FIGS. 4B and 4C is discussed hereinafter. The "Characteristic IDs" in column 1 serve as a means of identifying specific data item characteristics.

Characteristic ID #0 is a count of the records in a file. Data that is defined as "character" or "text (the terms are used interchangeably here), is evaluated for the characteristics listed in the table of FIGS. 4B and 4C with ID numbers from 1 through 23 as indicated by the "T" in column 2. All of the characteristics in the table are either "counts of data items with specific characteristics", or they are other "observations" about the data. This is indicated by the code in column 3. To better understand the descriptions of the characteristics as they appear in column 5, just add the phase "The number of items containing" to the beginning of each phrase which represents a count.

Even if a data item is defined as "text" it may still be numeric. Characteristics with ID numbers 3, 4, 11, 12, 14, 15, and 16, are also evaluated as numbers. In the case of characteristic number 14, the data represented therein may be an external numeric.

If a data item is defined in the record layout as numeric, it can be evaluated for the characteristics listed in the table of FIGS. 4B and 4C with ID numbers from 24 through 37 as indicated by the "N" in column 2.

Any text or numeric item can be evaluated as a date item. Accordingly, in the case of a text item, testing is conducted for the presence of a three letter month abbreviation, or a complete month name (this does require the adoption of certain local "customs" with regards to the representation of dates, such as language and culture). If a month is identified as the only alphabetic character element of a text string, the remainder of the string can be evaluated for year and day elements.

Number data (whether defined as numeric or not) can be more easily evaluated as a date, working from the more common formats such as "CCYYMMDD" (where CCYY is the century and year, MM is the month, and DD is the day), to less popular or partial date formats such as "YYJJJ" (where JJJ is the day of the year), or "DDMM" (which omits the year entirely). Date characteristics are then recorded as shown for characteristics with ID numbers 38 to 41. Only those dates which conform to the most popular formats are recorded.

It is entirely possible that a data item in a file may contain items that exhibit text, number and date item characteristics. However, when evaluating these counts and observations as a whole, a pattern will emerge for predominantly numeric, date, or text values. This finding is recorded as characteristic ID number 42.

Characteristics with ID numbers 43 and 44 represent the "group" properties of the domain type (the group characteristics are not dependent on the type of data). The first 350 unique values in each data item are recorded, and the number of instances of each value is counted, until the 351st unique value is encountered. If there are more than 350 values in a data item, then characteristic ID number 43 is flagged as "R" for range, the assumption being made that the domain of values in the data item is defined only as a value in the observed range. However, if there are between 1 and 350 unique values, then the domain type is recorded as "E" for enumerated domain". This information can identify possible values of "code" information. The selection of the number 350 is somewhat arbitrary and is motivated in part by practical system limitations. However, the assignment of "code" status to a variable, is also somewhat arbitrary. (The term "enumerated domain" is a technical term and is not, therefore, arbitrary.)

Characteristics with ID numbers 45 and 46 record the observed sequence of the contents of a data item, and the uniqueness of items that are in either ascending or descending order. The values for "sequence" are "R" for random, "A" for ascending, "D" for descending or "N" for no sequence (which is what you get when every occurrence of an item has the same value). If the sequence is either "A" or "D" then the item has either unique values or non-unique values.

Referring again to FIG. 4A, history files are evaluated during the first task 40 of the FA processing step. In particular, the file characteristic history file, the characteristic count history file, the characteristic observations history file, and the code history files are evaluated.

With regard to the file characteristic history file, in addition to the record count for each period, this file also records the date and time when the analysis was begun, and the number of data items defined for that file.

The characteristic count history file contains a record for every non-zero "count" characteristic as indicated by a "C" in column 3 of the table of FIGS. 4B and 4C.

The characteristic observations history file contains a record for every "observation" characteristic as indicated by an "O" in column 3 of the table of FIGS. 4B and 4C. Each record of this file has a separate column for "number", "text", and "data" observations, only one of which will be populated depending on the data type. Observation types are noted in column 4 of the table of FIGS. 4B and 4C. Note that a number observation may be specified as a "count", as opposed to some other representative value. "Text" observations that are blank are not recorded. Number or date observations that are zero are also not recorded. Dates are always converted to the CCYYMMDD, 8 digit format for storage.

The code history relates to those data items that have between 2 and 350 unique values, for which a code history record is written. This is similar to the characteristic observations history file with the addition of a count field showing the frequency of occurrence of each value.

Referring still to FIG. 4A, the second task 42 performed in the FA processing step involves comparing the most recent statistics with previous statistics and reporting the changes found. More specifically the second task involves reading the same files as in the first task, namely: the "Current Production Data"; the "File Information Parameters"; and the Data Item Characteristics"; but not the file being verified. The statistics of that file, having been written to the four "Data Characteristics" files (described above), are now read back into this step, and are compared to the information from previous versions, in order to evaluate the significance of any changes. This step can also be performed separately on all or part of the recorded analysis in order to update an online display of the file analysis information as in a production verification "ticker".

The results of this step are then written to the three report files of FIG. 1 which show: 1) detailed information; 2) significant variations; and 3) serious anomalies. For the "Detailed Information Report", all available information is reported. The more difficult issue is to determine what levels of change are "significant" and what levels qualify as "anomalous".

Referring again to the table of FIGS. 4B and 4C, three types of period to period comparisons are made: 1) characteristics that have changed; 2) characteristics that have remained completely unchanged; and 3) the initial appearance, or sudden disappearance of a characteristic.

The lowercase letters that appear in columns 6, 8, and 9 have the following meanings, and are reported as shown:

| Level of importance | Meaning | Reporting Level |
| --- | --- | --- |
| a | Ignore | "Detailed Information" |
| b | Of Interest | "Detailed Information" |
| c | Significant | "Significant Variations" |
| d | Serious | "Serious Anomalies" |
| e | Probable error | "Serious Anomalies" |

Anything reported on the "Serious Anomalies Report" will also be reported on the "Significant Variations Report". Everything will appear on the "Detailed Information Report". Items that appear on the "Significant Variations Report" also receive a brief mention on the "Serious Anomalies Report".

The "importance code" values in column 6 are for a "change code" value of "2". If the change code is a "3" the "importance code" is bumped up to the next level. The codes in column 8 are dependent on the quantity code in column 7 (described below).

The "degrees of change" are characterized below:

| Change Description | Codes for "Degree of change" | Percent change in the proportion of items with the specified characteristic |
| --- | --- | --- |
| no change | 0 | 0% |
| minor | 1 | greater than 0%, and less than 5% |
| significant | 2 | greater than 5%, and less than 8% |
| major | 3 | greater than 8% |

It should be understood, that change is only defined here for items with a non-zero count, or observation, in both periods. Any change in a type "T" observation is coded as a "2". If the quantity in both periods is "small" (see "quantity codes" below) then the change code is set to 1 resulting in no special reporting of changes. Note that the "small quantity" rule does not apply to non-count, numeric "observations" since these are not frequencies.

The importance of a characteristic remaining completely unchanged from one period to the next depends not only on the type of characteristic but also on the total amount (count or numerical observation) involved. "Quantity codes" are, therefore, characterized as follows:

| "Quantity Codes" | Type of amount |
| --- | --- |
| 1 | Small |
| 2 | Major |

The definition of a "small" quantity(s) as a function of the total is as follows:

1) If total<=50 then: s=50.
2) If total>50 and <=10,000,000 then:
   $s=950*((e^{}t - e^{}-t)/(e^{}t+e^{}-t)) + 5$
   where t=(total − 50)/1,000,000
3) If total>10,000,000 then: s=1,000

A "major quantity" is more than 20% of the total, going no lower than a "floor" of 100.

Enumerated domain (a.k.a. code) changes relate to the fact that any appearance of a new value, or disappearance of a value that appeared in the previous period must be reported as a "WARNING" on the "anomalies" report. The word "WARNING" is chosen because this is not necessarily a matter for alarm (the proportion of total values affected would determine the seriousness of this occurrence), but the user must accommodate the change so as to protect the referential integrity of the overall system. Changes in code value frequency counts are assigned an importance code of "d" for a degree of change of "2".

Overflow or underflow early warning involves comparing the three most recent versions of the data (including the new period) to warn users that the data item definitions may be becoming inadequate for the contents. Where the changes have been consistent from period to period, the following conditions may be detected. For text strings, the median string length may be approaching overflow. For numbers, the maximum number may be growing too fast, or the values may be running out of decimal positions. In the case of date information, the year 2000 may be approaching too soon for data items that cannot accommodate the century part of the year. These conditions are indicated on the "Significant Variations Report".

Any major change in a data item might be reflected as a change in multiple characteristics for a single data item. In order to avoid overwhelming the user with redundant warnings, only the few most serious conditions need to be mentioned for a single item on the "Serious Anomalies Report" (where brevity is of the essence). This is done by mentioning only the most important anomalies for each data type (as noted by the values in column 2 of the table of FIGS. 4B and 4C).

The order of importance among characteristic changes (or lack of change) is as follows: 1) "appearance/disappearance"; 2) "change"; and 3) "absence of change", leaving the early warning of overflow conditions as the least important type of change. The "Change Code" percentages and the codes in columns 6 through 9 of the table of FIGS. 4B and 4C can be modified to suit a particular entity's specific needs. Additionally a "file specific" or "data item specific" version of the parameters can be provided to override the installation global parameters. The values shown in the table of FIGS. 4B and 4C are default values.

The change in record count is always noted on each of the three reports. However, warning messages will only be printed as appropriate for large changes. Where there was no previous version of the data set or of an item, a note should be made on the reports but this is not indicated as a "serious anomaly" since the change will already have been noted in the "Data Item Change Report".

As stated earlier, the PM step monitors the verification process as it proceeds by posting information to a set of three online reports consisting of a serious anomalies report, a significant variations report and a detailed information report. The PM processing step is a manual operation that involves "watching" the files being created or updated, and determining whether or not the process is proceeding correctly. The information that is generated by the PM processing step described herein, provides monitoring information on each file within a short time after each file has been created or updated, thereby allowing for immediate follow-up.

The monitoring can of course be started at any time after the file processing has begun, but generally the sooner the problems are identified, the better.

As should now be apparent, the method of the present invention provides the important benefit of enabling the verification of computer generated data on the basis of characteristics of the information itself. The method provides a means of reporting on the contents of files without the need to define the structure of those files beyond that which has already been done in defining record layouts used in the programs that read from, or write to these files. The method of the present invention also identifies variations in file structure definitions. Furthermore, data is compared across time even though the internal coding of the data may have changed. In addition, the method of the present invention can identify new and/or missing items in enumerated domains and can note variations in file sequence and changes to the uniqueness of the "sort" item. The method can also provide an early warning for certain types of data item overflow or underflow and quantification of meaningful types of change in data, and does so in a way which can be "tuned" to best meet the needs of different systems. Finally, the method of the present invention centralizes file processes and file content information in a manageable set of reports which can be accessed in a way which is determined by the processing timeline, and the likely significance of changes in the data.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the invention may be varied substantially without departing from the spirit of the invention and the exclusive use of all modifications which come within the scope of the appended claims is reserved.

What is claimed is:

1. A method for verifying computer generated data in periodically updated and replaced files to determine if data item characteristics in said files have changed in an unexpected manner, said method comprising the steps of:

selecting a first version of each of said data item characteristics;

selecting a second subsequent version of each of said data item characteristics, each of said second subsequent versions of said data item characteristics being a new data item parameter;

analyzing said first version of each of said data item characteristics and said second subsequent version of each of said data item characteristics to produce first and second statistical profiles therefore; and comparing said first and second statistical profiles of each of said data item characteristics to each other to determine if any of said data item characteristics have changed in an unexpected manner or failed to change to an expected degree.

2. The method according to claim 1, further comprising the step of providing identifying information for each of said files to create a file information parameters file for each of said files prior to said step of selecting a first version of each of said data items, whereby said files can be compared across time, and wherein said first version of said data items are selected from said file information parameters file of each of said files.

3. The method according to claim 2, wherein said step of providing identifying information includes the step of assigning identifying means to each of said files.

4. The method according to claim 3, wherein said step of assigning identifying means includes the step of dating each of said identified files.

5. The method according to claim 3, wherein each of said files includes record layouts and said step of assigning identifying means includes the step of assigning identifying information to said record layouts of each of said files.

6. The method according to claim 5, wherein said step of compiling record layout information into a single file includes the steps of:

organizing said record layout information into a listing of all of said record layouts; and matching each of said data items across time periods.

7. The method according to claim 2, wherein said step of selecting a second subsequent version of each of said data items includes the step of compiling record layout information from said file information parameters file of each of said files into a single file.

8. The method according to claim 7, wherein said step of selecting a second subsequent version of each of said data items further includes the step of creating a new data item parameter file which includes said new data item parameters.

9. The method according to claim 8, wherein said step of selecting a second subsequent version of each of said data items further includes the step of providing a data item parameter change report.

10. The method according to claim 9, wherein said step of selecting a second subsequent version of each of said data items further includes the steps of:

assigning said new data item parameters with a production date; and adding said new parameter data item to a data item parameter history.

11. The method according to claim 8, wherein said method modifies its own processing parameters to accommodate changes in file structure and organization without manual intervention.

12. The method according to claim 2, wherein said step of analyzing includes the step of reading said file information parameters, said new data item parameters and a current production date file.

13. The method according to claim 12, wherein said step of analyzing further includes the step of quantifying changes observed in said file information parameters, said new data item characteristics and said current production date file to produce said first and second statistical profiles.

14. The method according to claim 13, wherein said step of analyzing further includes the step of reporting said first and second statistical profiles.

15. The method according to claim 14, wherein said step of analyzing further includes the step of identifying the introduction of unexpected data characteristics.

16. The method according to claim 13, wherein said step of analyzing includes the step of determining the significance of a lack of change of data item statistics over time.

17. The method according to claim 14, wherein said step of analyzing further includes the step of determining the impending threat of one of overflow problems and underflow problems including century overflow in date items, a lack of decimal precision, one of maximum or minimum numerical values approaching a limit of the containing data item, maximum string lengths approaching said limit of the containing data item, and table item overflow.

18. The method according to claim 12, wherein said step of providing identifying information includes the step of determining the characteristics of said files using record layout information and the contents of said files under investigation.

19. The method according to claim 18, wherein said record layout information comprises data item identification, data item length and position.

20. The method according to claim 19, wherein said record layout information further comprises numerical data item storage conventions.

21. The method according to claim 18, wherein said step of determining the characteristics of said files using record layout information and the contents of said files under investigation includes the step of determining data item characteristics while reading the file contents in a single pass.

22. The method according to claim 21, wherein said step of determining data item characteristics while reading the file contents in a single pass includes the step of determining data item characteristics as to their validity as dates and numbers.

23. The method according to claim 21, wherein said step of determining the characteristics of said files using record layout information and the contents of said files under investigation includes the step of determining data item characteristics according to the identification of enumerated domain data and variations in the domain over time.

24. The method according to claim 21, wherein said step of determining the characteristics of said files using record layout information and the contents of said files under investigation includes the step of identifying sort key component data items and determining whether said sort key data items are repeated or are unique.

25. The method according to claim 21, wherein said step of determining the characteristics of said files using record layout information and the contents of said files under investigation includes the step of classifying data item and file characteristics in a structure that provides extensibility.

26. The method according to claim 21, wherein said step of determining the characteristics of said files using record layout information and the contents of said files under investigation includes the step of determining data item characteristics according to the identification of enumerated domain data and variations in the domain over time.

27. The method according to claim 21, wherein said step of determining data item characteristics while reading the file contents in a single pass includes the step of determining data item characteristics with regard to their validity as dates and numbers.

28. The method according to claim 27, wherein said step of determining data item characteristics while reading the file contents in a single pass includes the step of determining the format of data items which represent date information.

29. The method according to claim 27, wherein said step of determining data item characteristics while reading the file contents in a single pass includes the step of evaluating external numeric data so as to determine their numerical properties.

30. The method according to claim 12, wherein said step of analyzing includes the step of analyzing files with multiple record formats.

31. The method according to claim 1, further comprising the step of monitoring said files being periodically updated, replaced and added to determine if said data item characteristics in said files have changed in an unexpected manner.

32. A method for verifying computer generated data in periodically updated and replaced files to determine if data item characteristics in said files have changed in an unexpected manner, said method comprising the steps of:

providing identifying information for each of said files to create a file information parameters file for each of said files, whereby said files can be compared across time;

selecting a first version of each of said data item characteristics from each of said file information parameters files;

compiling record layout information from said file information parameters file of each of said files into a single file;

creating a new data item parameter file which includes said new data item characteristics;

selecting a second subsequent version of each of said data item characteristics from said new data item characteristics file;

analyzing said first version of each of said data item characteristics and said second subsequent version of each of said data item characteristics to produce first and second statistical profiles therefor;

comparing said first and second statistical profiles of each of said data item characteristics to each other to determine if any of said data item characteristics have changed in an unexpected manner; and monitoring said files being periodically updated and replaced to determine if said data item characteristics in said files have changed in an unexpected manner.

33. The method according to claim 32, wherein said step of providing identifying information includes the step of assigning identifying means to each of said files.

34. The method according to claim 33, wherein said step of assigning identifying means includes the step of dating each of said identified files.

35. The method according to claim 33, wherein each of said files includes record layouts and said step of assigning identifying means includes the step of assigning identifying information to said record layouts of each of said files.

36. The method according to claim 32, wherein said step of compiling record layout information into a single file includes the steps of:

organizing said record layout information into a listing of all of said record layouts; and matching each of said data items across time periods.

37. The method according to claim 32, wherein said step of selecting a second subsequent version of each of said data items further includes the step of providing a data item parameter change report.

38. The method according to claim 37, wherein said step of selecting a second subsequent version of each of said data items further includes the steps of:

assigning said new data item characteristics with a production date; and adding said new parameter data item to a data item parameter history.

39. The method according to claim 32, wherein said step of analyzing said first version of each of said data item characteristics and said second subsequent version of each of said data item characteristics includes the step of reading said file information parameters, said new data item characteristics and a current production date file.

40. The method according to claim 39, wherein said step of analyzing said first version of each of said data item characteristics and said second subsequent version of each of said data item characteristics further includes the step of quantifying changes observed in said file information parameters, said new data item characteristics and said current production date file to produce said first and second statistical profiles.

41. The method according to claim 40, wherein said step of analyzing said first version of each of said data item characteristics and said second subsequent version of each of said data item characteristics further includes the step of reporting said first and second statistical profiles.

* * * * *